United States Patent
Hara

(10) Patent No.: US 10,645,245 B2
(45) Date of Patent: May 5, 2020

(54) IMAGE FORMING APPARATUS FOR SWITCHING A TYPE OF AN OFF STATE TO BE SHIFTED, DEPENDING ON TIME REQUIRED FOR SHIFT PROCESSING FOR SHIFTING TO THE OFF STATE, CONTROL METHOD FOR THE IMAGE FORMING APPARATUS, AND NON-TRANSITORY STORAGE MEDIUM

(71) Applicant: CANON KABUSHIKI KAISHA, Tokyo (JP)

(72) Inventor: Kenji Hara, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 7 days.

(21) Appl. No.: 13/867,854

(22) Filed: Apr. 22, 2013

(65) Prior Publication Data
US 2013/0308148 A1 Nov. 21, 2013

(30) Foreign Application Priority Data

May 21, 2012 (JP) ................. 2012-115188

(51) Int. Cl.
| | | |
|---|---|---|
| H04N 1/00 | (2006.01) | |
| G03G 15/00 | (2006.01) | |
| G06F 1/3234 | (2019.01) | |

(52) U.S. Cl.
CPC ..... *H04N 1/00896* (2013.01); *G03G 15/5004* (2013.01); *H04N 1/00899* (2013.01); *G06F 1/3284* (2013.01)

(58) Field of Classification Search
None
See application file for complete search history.

(56) References Cited

U.S. PATENT DOCUMENTS

| | | | | |
|---|---|---|---|---|
| 8,520,249 | B2* | 8/2013 | Muto et al. | ........... 358/1.16 |
| 8,605,304 | B2* | 12/2013 | Yanazume | ...... G06K 15/409 |
| | | | | 358/1.14 |
| 2005/0110898 | A1 | 5/2005 | Ryu | |
| 2006/0007469 | A1* | 1/2006 | Uruma | ......... H04N 1/0035 |
| | | | | 358/1.14 |
| 2007/0016809 | A1* | 1/2007 | Kida | ............. G06F 1/3203 |
| | | | | 713/300 |
| 2007/0280708 | A1* | 12/2007 | Kamisuwa | ...... G03G 15/5004 |
| | | | | 399/37 |
| 2007/0285717 | A1 | 12/2007 | Muto | |

(Continued)

FOREIGN PATENT DOCUMENTS

| | | |
|---|---|---|
| CN | 1731298 A | 2/2006 |
| CN | 102006385 A | 4/2011 |

(Continued)

*Primary Examiner* — Nicholas Pachol
(74) *Attorney, Agent, or Firm* — Canon U.S.A., Inc. IP Division

(57) ABSTRACT

An image forming apparatus includes a power switch configured to switch between an ON state and an OFF state in accordance with an operation of a user, a control unit configured to cancel a job stored in the image forming apparatus in a case where the power switch is switched to the OFF state, and a power control unit configured to shift a state of the image forming apparatus to a first state if the job is cancelled by the control unit, and to shift the state of the image forming apparatus to a second state if the job is not cancelled by the control unit.

21 Claims, 6 Drawing Sheets

(56) References Cited

U.S. PATENT DOCUMENTS

| | | | | |
|---|---|---|---|---|
| 2008/0028448 A1* | 1/2008 | Tsuchitoi | | G06F 3/1214 726/6 |
| 2009/0070604 A1* | 3/2009 | Kumakura | | G03G 15/5004 713/310 |
| 2009/0073487 A1* | 3/2009 | Li | | H04N 1/0097 358/1.15 |
| 2009/0122345 A1* | 5/2009 | Tanaka | | G03G 15/5012 358/1.16 |
| 2009/0201529 A1* | 8/2009 | Takahara | | G06F 3/1222 358/1.15 |
| 2009/0273805 A1* | 11/2009 | Nakagawa | | G06Q 10/06 358/1.15 |
| 2009/0279136 A1* | 11/2009 | Kanno | | G06F 3/121 358/1.15 |
| 2009/0323120 A1* | 12/2009 | Yamanaka | | G03G 15/5004 358/1.16 |
| 2010/0106993 A1 | 4/2010 | Song | | |
| 2010/0211513 A1* | 8/2010 | Yoshida | | G06Q 30/018 705/317 |
| 2010/0253965 A1* | 10/2010 | Ogisu | | G03G 15/5004 358/1.14 |
| 2011/0037999 A1* | 2/2011 | Sano | | G03G 15/5012 358/1.15 |
| 2011/0051166 A1* | 3/2011 | Nishikawa | | G06K 15/00 358/1.13 |
| 2011/0205573 A1* | 8/2011 | Yanazume | | G06K 15/409 358/1.14 |
| 2011/0222101 A1* | 9/2011 | Nakamura | | G03G 15/5004 358/1.14 |
| 2011/0222898 A1* | 9/2011 | Kidaka | | G03G 15/0258 399/97 |
| 2011/0235108 A1* | 9/2011 | Kato | | G06F 3/1218 358/1.15 |
| 2011/0314311 A1* | 12/2011 | Maeda | | G06F 1/3209 713/320 |
| 2012/320402 A1* | 12/2012 | Okuzono et al. | | 358/1.14 |
| 2013/0201512 A1* | 8/2013 | Takatani | | G03G 15/5004 358/1.13 |

FOREIGN PATENT DOCUMENTS

| | | |
|---|---|---|
| JP | H09-230754 A | 9/1997 |
| JP | 11-3006 A | 1/1999 |
| JP | 2006072972 A | 3/2006 |
| JP | 2007320051 A | 12/2007 |
| JP | 2008065242 A | 3/2008 |
| JP | 2009271413 A | 11/2009 |
| JP | 2011025562 A | 2/2011 |
| JP | 2011041016 A | 2/2011 |
| JP | 4732248 B2 | 7/2011 |
| JP | 2012018554 A | 1/2012 |
| KR | 10-2006-0049987 A | 5/2006 |
| RU | 2222112 C1 | 1/2004 |
| RU | 2224283 C2 | 2/2004 |

* cited by examiner

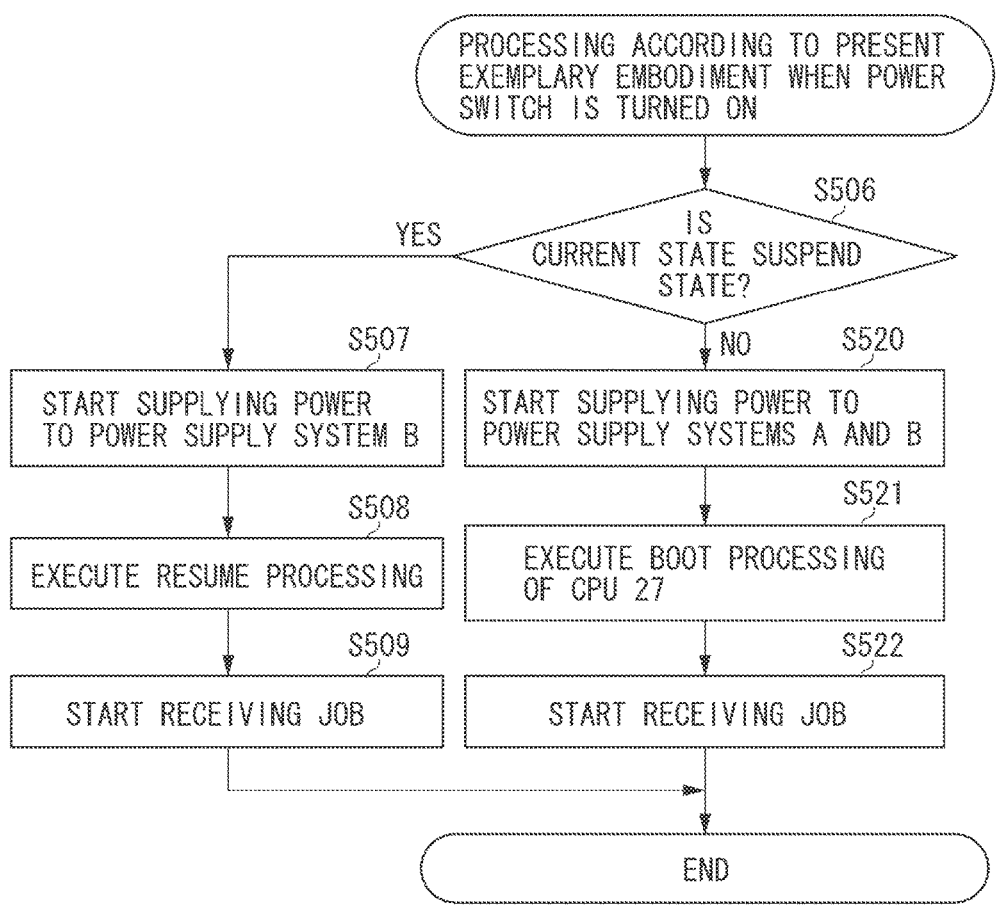

IMAGE FORMING APPARATUS FOR SWITCHING A TYPE OF AN OFF STATE TO BE SHIFTED, DEPENDING ON TIME REQUIRED FOR SHIFT PROCESSING FOR SHIFTING TO THE OFF STATE, CONTROL METHOD FOR THE IMAGE FORMING APPARATUS, AND NON-TRANSITORY STORAGE MEDIUM

BACKGROUND OF THE INVENTION

Field of the Invention

The present invention relates to an image forming apparatus capable of shifting to a high-speed activatable state when the OFF operation of a power switch is performed, a control method for the image forming apparatus, and a storage medium.

Description of the Related Art

Image forming apparatuses and information processing apparatuses of recent years have had multiple functions and, therefore, have a problem in taking longer time from the operation of a power switch by a user to an operable state in which the user can actually operate the apparatus.

Some apparatuses have a function called "suspend" (suspend mode) to deal with such a problem. When a user performs the OFF operation on a power switch, the operation of a program in execution is suspended by the suspend function such that the program can return to an operation state which is substantially the same as the current operation state.

Moreover, some apparatuses have a function called "resume". This resume function activates the apparatus in an operation state which is substantially the same as the state at the time of termination of a preceding operation when a user performs the ON operation on a power switch. That is, the operation state returns to a preceding state when the user turns on the power switch.

According to the suspend function, the image forming apparatus in a normal operation mode can shift to the suspend mode, which causes an operation of each unit to be suspended, while the apparatus remains in a state immediately before suspension of the operation.

According to the resume function, moreover, the image forming apparatus in the suspend mode can return to the normal operation mode in a state immediately before shifting to the suspend mode.

Thus, these functions enable the image forming apparatus, such as a digital multifunction peripheral, to be activated at high speed, thereby promptly returning the image forming apparatus to a preceding operation state.

Moreover, the high-speed activation technique for retaining these memory values has a problem in which when the apparatus is shifted to the suspend mode during execution of processing, time elapses while processing is being interrupted.

Japanese Patent Application Laid-Open No. 11-3006 discusses an image forming apparatus which remains in a power-saving shift reserved state until a predetermined time elapses even when a power-saving shift key is operated.

If the high-speed activation technique retaining a memory value, for example, a suspend mode, is used for a power switch of the apparatus, a shift of the apparatus to the suspend mode during execution of processing such as a job causes the following phenomena.

1) immediately after the power supply is turned on, a job interrupted by power off is executed.

2) immediately after the power supply is turned on, a job interrupted by power off is displayed as an error.

Since the power switch is primarily used as a function of turning off the apparatus, the job interrupted by the switch-off should not be executed.

Moreover, even when the apparatus remains in the power-saving shift reserved state until a predetermined time elapses in spite of operation of the power-saving shift key as discussed in Japanese Patent Application Laid-Open No. 11-3006, similar problems may occur in a case where a job in execution or a job on standby is not completed within a predetermined time period.

SUMMARY OF THE INVENTION

The present invention is directed to an image forming apparatus capable of being activated at high speed when the OFF operation of a power switch is performed. Moreover, the image forming apparatus is capable of preventing a problem caused by a job interrupted by suspension such that the problem does not occur after activation of the image forming apparatus even when the image forming apparatus is activated from a suspend state by the ON operation of the power switch, the suspend state being led by the OFF operation of the power switch during previous job execution.

According to an aspect of the present invention, an image forming apparatus includes a power switch configured to switch between an ON state and an OFF state in accordance with an operation of a user, a control unit configured to cancel a job stored in the image forming apparatus in a case where the power switch is switched to the OFF state, and a power control unit configured to shift a state of the image forming apparatus to a first state if the job is cancelled by the control unit, and to shift the state of the image forming apparatus to a second state if the job is not cancelled by the control unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flowchart illustrating an example of processing performed by the MFP according to the exemplary embodiment of the present invention when the power switch is turned on.

DESCRIPTION OF THE EMBODIMENTS

Various exemplary embodiments, features, and aspects of the invention will be described in detail below with reference to the drawings.

Figure 1:
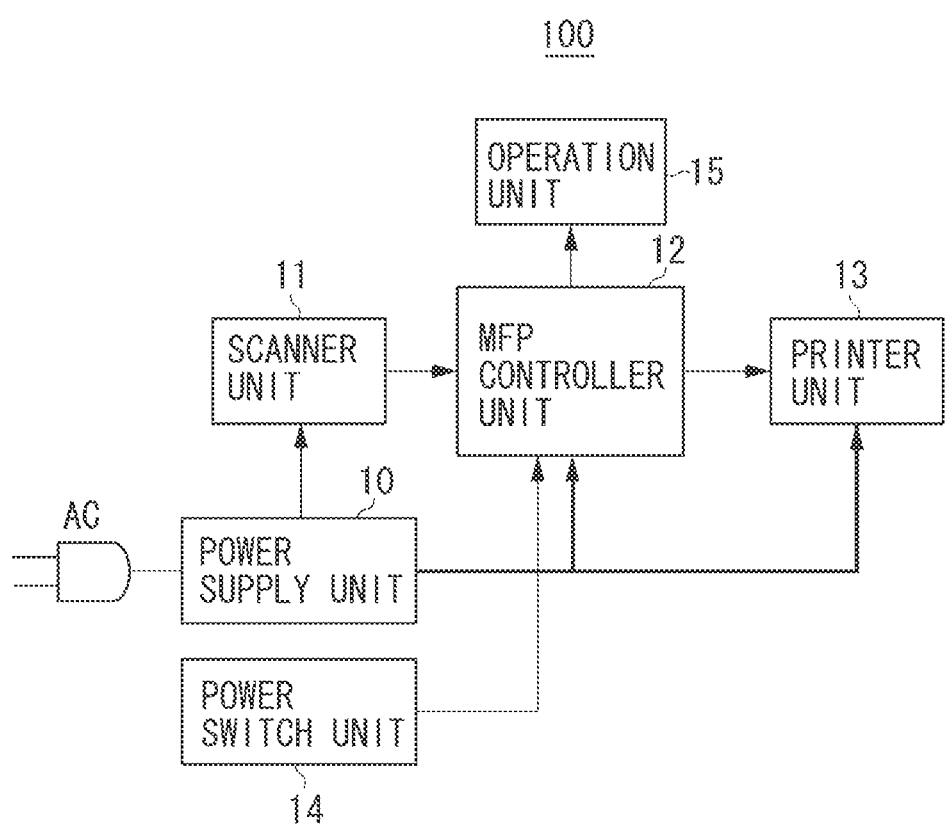
FIG. 1 is a block diagram illustrating a schematic configuration of a multifunctional peripheral (MFP) as an image forming apparatus according to an exemplary embodiment of the present invention.

FIG. 1 is a block diagram illustrating a schematic configuration of a multifunctional peripheral (MFP) 100 as an image forming apparatus according to an exemplary embodiment of the present invention. The MFP 100 has multiple functions such as a copy function, a printer function, and a scanner function.

In FIG. 1, an MFP controller unit 12 controls the entire MFP 100. A printer unit 13 performs image processing according to, for example, an electrophotographic method. A scanner unit 11 optically reads an image from a document and coverts the image into a digital image.

Moreover, a power supply unit 10 supplies power to each control unit of the MFP 100. An operation unit 15 is used when a user operates the MFP 100. A power switch unit 14 allows the user to perform an ON operation and an OFF operation of power supply, and is used to control a power supply state of the MFP 100.

With such a configuration, the MFP 100 having the copy function, printer function, and scanner function is formed. A recording method of the printer unit 13 is not limited to the electrophotographic method as long as the printer unit 13 can perform image processing on two sides of a sheet-like recording medium (e.g., a recording sheet of paper). Alternatively, a recording method such as an inkjet method and a thermal transfer method may be used.

Figure 2:
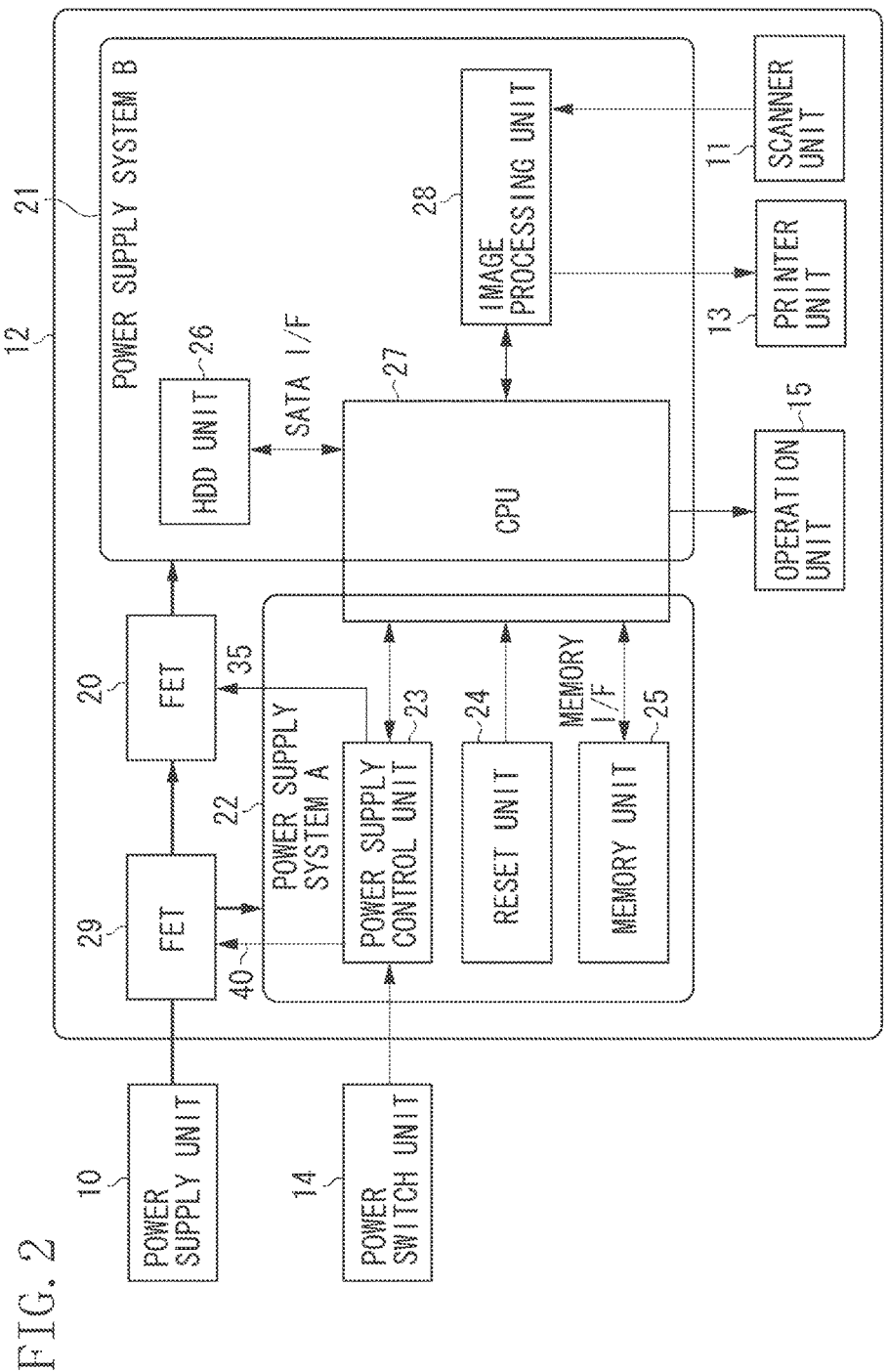
FIG. 2 is a block diagram illustrating a schematic configuration of an MFP controller unit.

FIG. 2 is a block diagram illustrating a schematic configuration of the MFP controller unit 12 illustrated in FIG. 1. In the following description, a description of the components that have already been described is not repeated.

In FIG. 2, a power supply control unit 23 has a function of notifying a central processing unit (CPU) 27 of an ON operation or an OFF operation performed on the power switch unit 14 as interruption. Moreover, the power supply control unit 23 cuts off the power supply to each unit when the MFP 100 is shifted to a power saving mode, and supplies power to each unit when the MFP 100 returns from the power saving mode.

A reset unit 24 is a reset control unit for causing reboot processing to be executed by issuing a reset instruction to the CPU 27 and the entire system based on a control signal from the power supply control unit 23. A field-effect transistor (FET) 20 is a switch used to turn on and off the power supply to a power supply system B 21. An FET 29 is a switch used to turn off the power supply to a power supply system A 22 and the power supply system B 21.

The CPU 27 is a control unit for controlling the entire MFP 100. A memory unit 25 is a volatile storage unit, such as a double data rate synchronous dynamic random-access memory (DDR SDRAM).

An image processing unit 28 is a control unit for performing processing, such as compression of data from the scanner unit 11 and outputting of image data processed by the CPU 27 to the printer unit 13. A hard disk drive (HDD) unit 26 is an external storage apparatus, for example, a non-volatile storage unit, such as an HDD.

Next, a power system of the MFP controller unit 12 is described.

The present exemplary embodiment is described using an example case in which the suspend method is applied. In the suspend method, data is retained in a memory in a state that power consumption is less than that in a normal state and activation (back to the normal state) is performed at high-speed. However, other methods, for example, a hibernation method may be used.

Accordingly, when the OFF operation of the power switch unit 14 is detected, the MFP 100 executes suspend processing. In the suspend processing, the operation of a program in execution is suspended such that the MFP 100 can return to an operation state substantially the same as an operation state at that time. Upon suspension of the operation in execution, the MFP 100 stores a system state in the memory unit 25, and is shifted to a suspend state in which the power supply to the power supply system B 21 is cut off. Then, when the ON operation of the power switch unit 14 is performed next time, the MFP 100 restarts the program by returning to the system state. In the present exemplary embodiment, assume that the system state is a normal state. The suspend state is a power saving state in which a power consumption amount of the MFP 100 is less than that in the normal state. Moreover, the MFP 100 can also be shifted to another power saving state such as a hibernation state. That is, when a shift is made from the system state to the power saving state, the system state can be stored in the HDD unit 26 instead of the memory unit 25, and the power supply to the memory unit 25 can be cut off.

The power supply system A 22 supplies power to the power supply control unit 23, the reset unit 24, and the memory unit 25. Moreover, the power supply system A 22 supplies power to a portion of the CPU 27. In any power saving mode, the power supply to the power supply system A 22 is not cut off so that the power supply system A 22 manages a power state of the entire MFP 100 and enables the MFP 100 to return from the power saving mode.

The power supply system B 21 supplies power to the CPU 27, the image processing unit 28, and the HDD unit 26. The power cut-off and the power supply of the power supply system B 21 is controlled by controlling the FET 20 according to a control signal 35 output from the power supply control unit 23.

The power cut-off of each of the power supply system A 22 and the power supply system B 21 is controlled by controlling the FET 29 according to a control signal 40 output from the power supply control unit 23.

Figure 3:
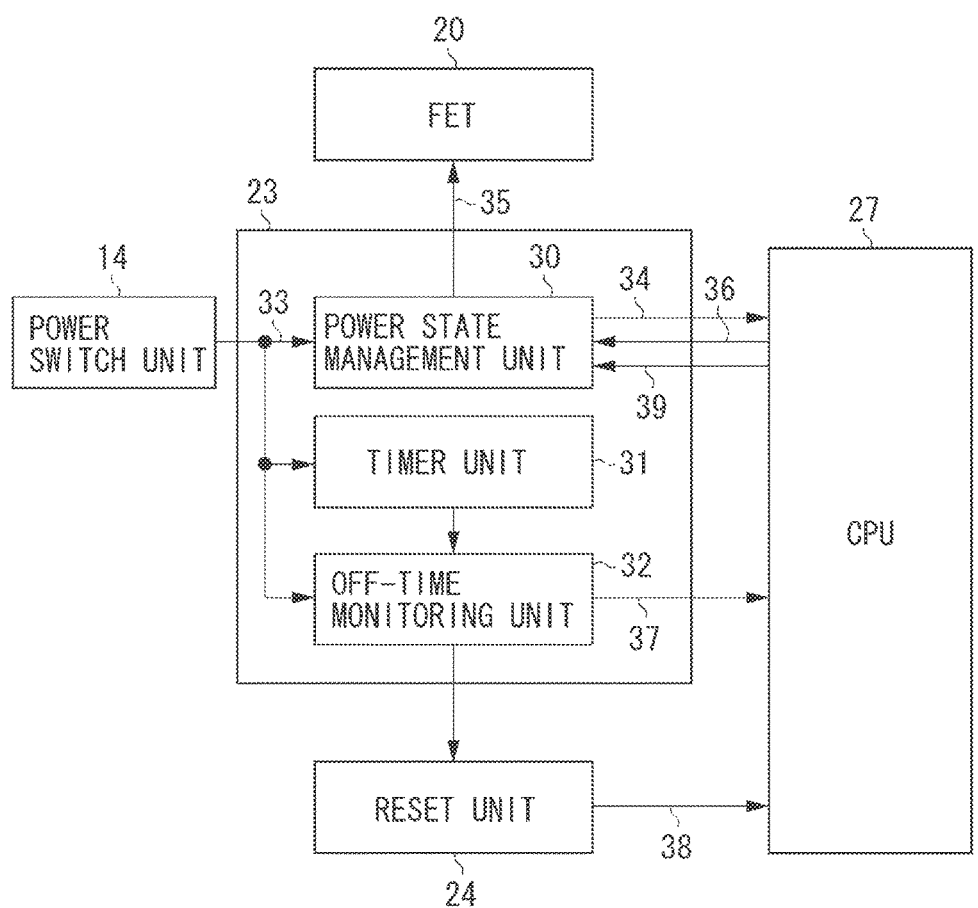
FIG. 3 is a block diagram illustrating a schematic configuration of a power supply control unit.

FIG. 3 is a block diagram illustrating a schematic configuration of the power supply control unit 23 illustrated in FIG. 2.

In the power supply control unit 23, a power state management unit 30 detects an OFF operation of the power switch unit 14, and notifies the CPU 27 of a state of the power switch unit 14 via an interrupt signal 34.

After detecting the state of the power switch unit 14, the CPU 27 selects either (A) a shift to a suspend state or (B) a shift to a shutdown state, and executes the selected one.

<If (A) a Shift to the Suspend State is Selected>

The CPU 27 notified of the state via the interrupt signal 34 executes processing for shifting the MFP 100 to the suspend state, in which power consumption is less than that in a normal state and activation is performed at high speed.

After the MFP 100 is shifted to the suspend state, the CPU 27 notifies the power supply control unit 23 of completion of the suspend shift processing via a suspend processing completion signal 36.

Upon receipt of the suspend processing completion signal 36, the power state management unit 30 controls the FET 20 via an FET control signal 35, and cuts off the power supply to the power supply system B 21. Moreover, when the ON operation of the power switch unit 14 is detected, the power state management unit 30 controls the FET 20 via the FET control signal 35, and starts supplying power to the power supply system B 21.

Herein, the FET 29 is open, and the power supply to the power supply system A 22 continues, while a CPU operation state is retained in the memory unit 25.

<If (B) a Shift to the Shutdown State is Selected>

The CPU 27 notified of the state via the interrupt signal 34 executes shutdown processing when determining that the system is terminated completely.

After termination processing of an application, the CPU 27 notifies the power supply control unit 23 of the completion of the shutdown processing via a system termination completion signal 39.

When receiving the system termination completion signal 39, the power state management unit 30 controls the FET 29 (see FIG. 2) via an FET control signal 40 (see FIG. 2), and cuts off the power supply to the power supply system A 22 and the power supply system B 21. Thus, the power supply to the MFP 100 is completely turned off.

When the ON operation of the power switch unit 14 is performed after the power supply is completely turned off, the MFP 100 is activated by normal activation instead of suspend activation. In the normal activation, the FET 20 and the FET 29 are energized, thereby activating a system. The suspend activation is described below.

A timer unit 31 begins to measure a time from detection of the OFF operation of the power switch unit 14. Simultaneously, an OFF-time monitoring unit 32 monitors whether the power state management unit 30 has received the suspend processing completion signal 36. That is, if the MFP 100 is not shifted to the suspend state within a certain time although the power switch unit 14 is turned off, the timer unit 31 determines that software has hung, and the OFF-time monitoring unit 32 issues a hardware reset instruction to the reset unit 24. The reset unit 24, functioning as a safety device, issues a reset signal 38 to the CPU 27 to forcibly turn off the power supply. The arrangement of the timer unit 31 can avoid a trouble in which the power supply is not turned off although the power switch unit 14 is turned off.

A conventional shutdown sequence is described with reference to FIG. 4.

Figure 4:
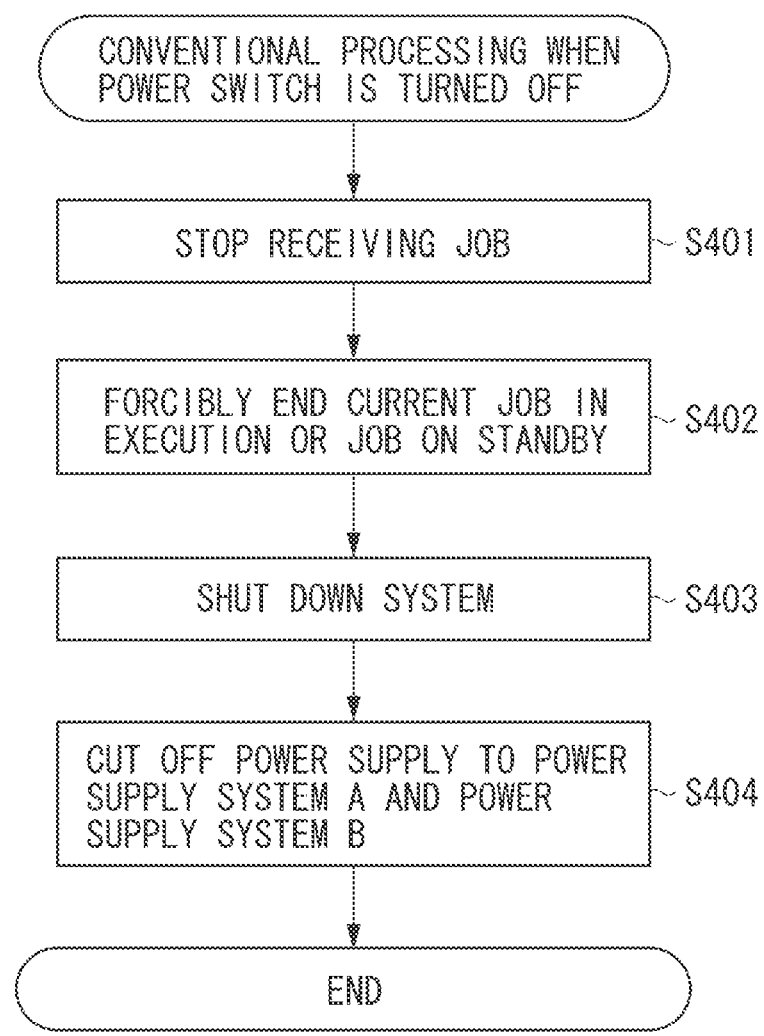
FIG. 4 is a flowchart illustrating an example of a conventional shutdown sequence when a power switch is turned off.

FIG. 4 is a flowchart illustrating an example of the conventional shutdown sequence when a power switch is turned off.

The power supply control unit 23 notifies the CPU 27 of the interrupt signal 34 when the OFF operation of the power switch unit 14 by the user is detected. Upon receipt of the notification, the CPU 27 starts processing of the flowchart.

In step S401, the CPU 27 stops receiving a job as a batch of processing to be executed by the MFP 100 such that the job is not received during system termination.

In step S402, the CPU 27 forcibly terminates a current job in execution or a job on standby (an accumulated job) if there is any. When a job is forcibly terminated, a generation state of a current job is cleared regardless of the current job state. If a job is stored in a hard disk device, data of the job is cleared. If a job is retained on a memory, a state of the job is changed so that the job should never be executed.

Subsequently, in step S403, the CPU 27 issues a shutdown command to the system, and termination processing is performed on the system such as kernel.

When the system termination processing is completed, the operation proceeds to step S404. In step S404, the CPU 27 issues the system termination completion signal 39, and cuts off the power supply to the power supply system A 22 and the power supply system B 21. Thus, the electricity to the MFP 100 is completely turned off. When the power switch unit 14 is turned on next time, the system is reset and activated.

In the above-mentioned conventional sequence, since a state of the memory unit 25 is cleared, high-speed activation cannot be achieved.

Figure 5:
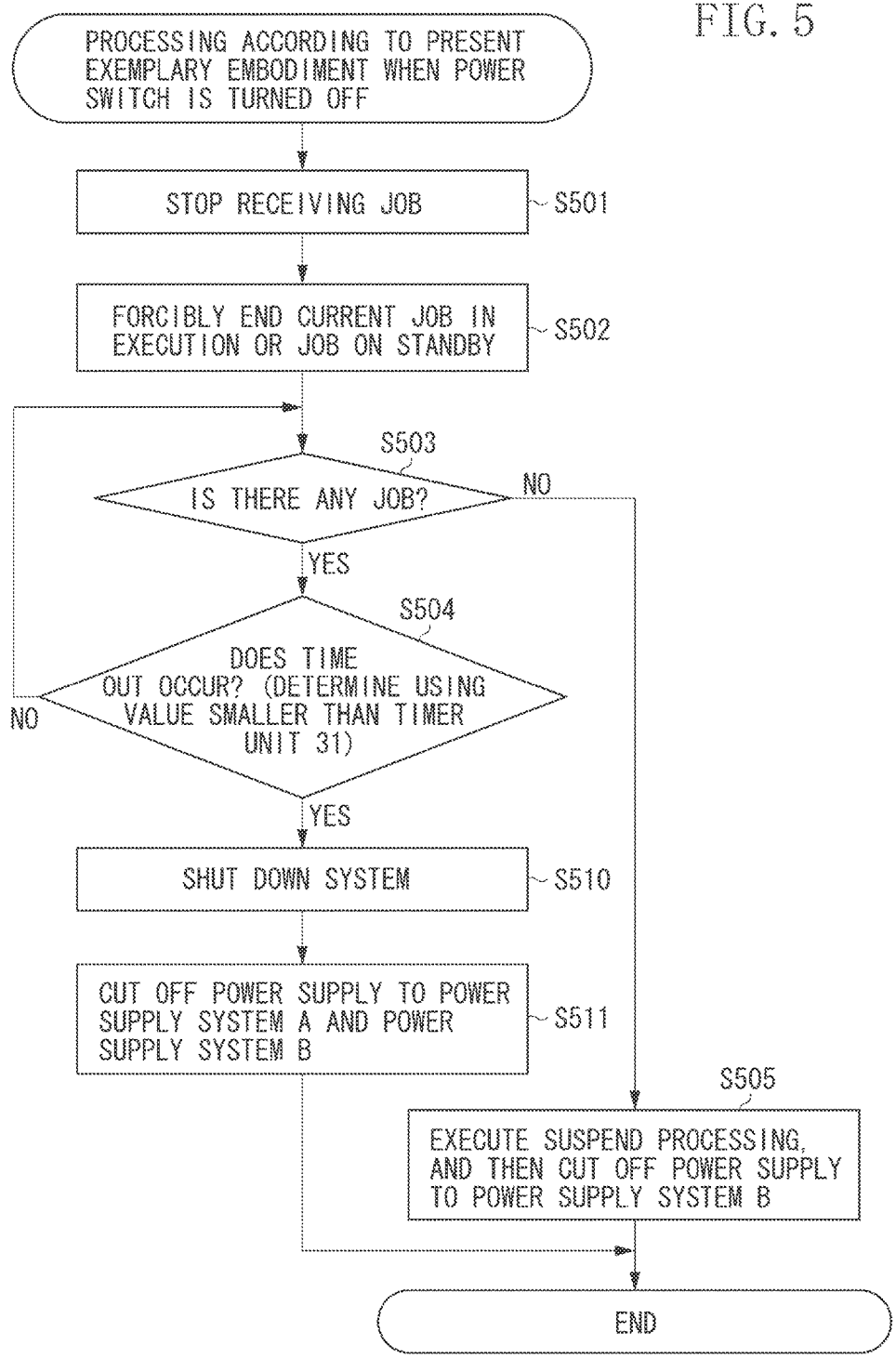
FIG. 5 is a flowchart illustrating an example of processing performed by the MFP according to the exemplary embodiment of the present invention when a power switch is turned off.

Next, a description is given of processing by the MFP 100 according to the present exemplary embodiment when a power switch is turned off with reference to FIG. 5.

FIG. 5 is a flowchart illustrating an example processing by the MFP 100 according to the present exemplary embodiment when the power switch unit 14 is turned off. The processing of this flowchart is performed by the CPU 27 by reading and executing a computer-readable program stored in the HDD unit 26 or the memory unit 25.

The power supply control unit 23 notifies the CPU 27 of the interrupt signal 34 when the OFF operation of the power switch unit 14 by the user is detected. Upon receipt of the notification, the CPU 27 starts processing of the flowchart.

In step S501, the CPU 27 stops receiving a job as a batch of processing to be executed by the MFP 100 such that the job is not received during system termination. The CPU 27 also starts measuring a time-out time for step S504, which is described below.

In step S502, the CPU 27 forcibly terminates a current job in execution or a job on standby (an accumulated job) if there is any. When a job is forcibly terminated, a generation state of a current job is cleared regardless of the current job state. If a job is stored in a hard disk device, data of the job is cleared. If a job is retained on a memory, a state of the job is changed so that the job should never be executed.

Subsequently, in step S503 and step S504, the CPU 27 monitors, with time-out, whether there is any remaining job (whether all the jobs are completely terminated). In step S504, the CPU 27 determines whether the time-out has occurred based on a first time which is shorter than a second time. The first time elapses from detection of the OFF operation of the power switch unit 14 to determination of time-out, and the second time elapses from the OFF operation of the power switch unit 14 to a time when the timer unit 31 determines that the MFP 100 needs to be reset.

If the CPU 27 determines that all the jobs are terminated completely (there is no job) before the time-out time elapses (NO in step S503), the operation proceeds to step S505. In step S505, the CPU 27 executes suspend shift processing, and the system enters into an interruption state. Moreover, after shifting to the suspend state, the CPU 27 notifies the power supply control unit 23 of the suspend processing completion signal 36. Upon receipt of the suspend processing completion signal 36, the power supply control unit 23 cuts off the power supply to the power supply system B 21, thereby shifting the system to the suspend state.

On the other hand, if the CPU 27 determines that the absence of the job is not detected (there is still a job to be terminated) (YES in step S503), and determines that the time-out of a job termination waiting period has occurred (YES in step S504), then the operation proceeds to step S510. In step S510, the CPU 27 abandons the suspend processing, and shuts down the system. In step S511, the CPU 27 performs an existing power off operation.

That is, in step S510, the CPU 27 issues a shutdown command to the system, and performs termination processing on the system such as kernel.

When the system termination processing is completed, the operation proceeds to step S511. In step S511, the CPU 27 issues the system termination completion signal 39 to the power state management unit 30, and the power state management unit 30 issues the control signal 40 to the FET 29. According to these signals, the CPU 27 cuts off the power supply to the power supply system A 22 and the power supply system B 21. Thus, the system of the MFP 100 is properly terminated, and the electricity is completely turned off. When the power switch unit 14 is turned on next time, the system is reset and activated.

Therefore, when the user performs the OFF operation on the power switch unit 14, the MFP 100 according to the present exemplary embodiment performs cancel processing for cancelling a job in execution or a job on standby. If the job in execution or the job on standby can be cancelled by the cancel processing, the MFP 100 is shifted to the suspend state. On the other hand, if the job in execution or the job on standby cannot be cancelled by the cancel processing, the MFP 100 is shifted to the OFF state.

As illustrated in FIG. 3, the MFP 100 according to the present exemplary embodiment includes the timer unit 31, so that the power supply of the MFP 100 is reliably turned off within a certain time when the power switch unit 14 is turned off. That is, the MFP 100 includes an emergency unit for reliably turning off the power supply thereof. The emergency unit is an important element of the MFP 100. However, if termination of a job takes time after execution of the forcible termination processing on the job (step S502), the system is reset by the timer unit 31 during the job termination processing, causing forcibly cutting off the power supply to the MFP 100 with the system remaining interrupted.

Consequently, the MFP 100 according to the present exemplary embodiment has the time-out processing in step S504. Thus, before the power supply is cut off by the timer unit 31, the time-out is determined in step S504 and a shutdown is performed such that the system is normally terminated.

Any of a case where the system is normally terminated by a shutdown and a case where the system is forcibly terminated by the timer unit 31 with the system interrupted, the system is cold-booted (normal activation) when the power supply is turned on next time. During the cold boot, the system is determined as to whether a previous job thereof was terminated normally. In a case where the system was not terminated normally in the previous job operation, there is a possibility that, for example, recovery processing needs to be performed. Accordingly, the system should be terminated normally.

If suspend is used in a normal sleep function (i.e., a user operation or a job is not received for a predetermined time period), completion of a job can be waited, and then the system is shifted to the suspend state. On the other hand, if suspend is used by turning off a power switch, a situation differs from that in the normal sleep function. However, a cutoff of the power supply in a forcible manner should not always be performed with the system remaining interrupted without normal termination.

In the present exemplary embodiment, generally, even if termination of a job takes time, the time-out is determined in step S504, and the system is shut down within a certain time period (system is terminated normally). Moreover, even in case of emergency such as when a shutdown cannot be executed based on the determination made in step S504 due to hang-up of processing performed by software, the power supply can be forcibly cut off by the timer unit 31, thereby reliably turning off the power supply of the MFP 100 within a certain time period.

According to the present exemplary embodiment, when a power switch is turned off, the power supply of the MFP 100 is turned off within a certain time period. Meanwhile, the use of suspend enables the MFP 100 to be activated at high-speed in most of the normal use.

Processing by the MFP 100 according to the present exemplary embodiment when the power switch is turned on is described with reference to FIG. 6.

FIG. 6 is a flowchart illustrating an example of the processing by the MFP 100 according to the present exemplary embodiment when the power switch unit 14 is turned on. The processing of this flowchart is executed by the power supply control unit 23 and the CPU 27. Processing to be executed by the CPU 27 is performed by reading and executing a computer-readable program stored in the HDD unit 26 or the memory unit 25.

When the power switch unit 14 is turned on, the processing of this flowchart starts.

In step S506, the power supply control unit 23 determines whether a current state is the suspend state. Since the power supply control unit 23 is arranged to be energized from the power supply system A 22, the power supply control unit 23 can detect a turn-on of the power switch unit 14 if the power supply control unit 23 is being energized at the time of the turn-on. In this case, the power supply control unit 23 determines that the current state is the suspend state (YES in step S506), and then the operation proceeds to step S507.

In step S507, the power supply control unit 23 controls the FET 20 via the FET control signal 35, and starts supplying power to the power supply system B 21.

Subsequently, in step S508, the power supply control unit 23 notifies the CPU 27 of a resume signal 37, and the CPU 27 executes resume processing. In step S509, when the resume processing ends, the CPU 27 starts receiving a job again and returns to a normal state.

The sequence of steps S507 through S509 executed when "YES" is determined in step S506 is an operation performed when the suspend processing is selected by the OFF operation of the power switch unit 14 (i.e., an operation normally performed when there is no job). The execution of this sequence enables the MFP 100 to be activated at high speed as compared to a case where the MFP 100 is cold booted (normal activation).

On the other hand, if the power supply control unit 23 is not being energized at the time of the turn-on, that is, the power supply control unit 23 is energized by the turn-on, the current state is a complete OFF state subsequent to a shutdown (i.e., not the suspend state) (NO in step S506), the operation proceeds to step S520. In step S520, the power supply to the power supply system A 22 and the power supply system B 21 is started.

Accordingly, such power supply causes the system to be reset, and the cold boot (normal activation) of the system begins. Particularly, in step S521, a reset of the CPU 27 generates a reset exception, and a boot program begins to operate (boot processing of the CPU 27). The boot program enables a control program to be read from the HDD unit 26 into the memory unit 25, and the program loaded on the memory unit 25 is executed, thereby activating the system.

When the system is activated, the CPU 27 becomes ready to receive a job. In step S522, the CPU 27 starts receiving a job.

The sequence of steps S520 through S522 executed when "NO" is determined in step S506 is an operation performed when shutdown processing is selected by the OFF operation of the power switch unit 14. In such a case, since a state of the memory unit 25 is already cleared, the MFP 100 cannot be activated at high speed such as activation by resume processing. In this case, a job group without a job termination waiting period in step S503 illustrated in FIG. 5 is deleted by resetting the system, and an effect which is substantially the same as that in the conventional power off operation (FIG. 4) can be achieved.

As described above, the MFP 100 according to the present exemplary embodiment can prevent conventional problems generated immediately after the MFP 100 is activated by turning on a main switch (the power switch unit 14). The conventional problems include delay execution of a job instructed before the main switch was turned off in a previous operation, and a sudden occurrence of a job error. The MFP 100 according to the present exemplary embodiment can achieve high-speed activation by applying the memory resume technique with substantially the same operation as a main switch operation of an MFP having only a conventional shutdown function.

Accordingly, the MFP 100 according to the present exemplary embodiment can be activated at high speed when the ON operation of the power switch unit 14 is performed. Moreover, the cancel processing is performed according to the present exemplary embodiment, so that the MFP 100 can reduce a problem caused by a job interrupted by suspension such that the problem does not occur after activation of the MFP 100 even when the MFP 100 is activated from the suspend state by the ON operation of the power switch, the suspend state being led by the OFF operation of the power switch unit 14 during previous job execution.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-115188 filed May 21, 2012, which is hereby incorporated by reference herein in its entirety.

What is claimed is:

1. An image forming apparatus comprising:
an interface that receives an operation to switch a power state of the image forming apparatus from an ON state to an OFF state;
a timer that measures a time in accordance with the reception of the operation to switch the power state of the image processing apparatus from the ON state to the OFF state;
one or more processors including a central processing apparatus (CPU); and
a memory storing instructions that, when executed by the one or more processors, cause the one or more processors to:
cancel, by the one or more processors, one or more jobs which are stored in the image forming apparatus in accordance with the reception by the interface of the operation to switch the power state of the image forming apparatus to the OFF state; and
perform first processing to shift, after the cancellation of the one or more jobs is completed by the one or more processors, the power state of the image forming apparatus to a first OFF state which is different from a shutdown state, under at least a condition that the one or more jobs have been cancelled by the one or more processors in a first predetermined time period, wherein, in the first OFF state, a storage stores information that has been stored in the image forming apparatus before the image forming apparatus shifts to the first OFF state, and
perform second processing to shift, under at least a condition that a cancellation of the one or more jobs has been started to shift the power state of the image forming apparatus to the first OFF state but the one or more jobs have not been cancelled by the one or more processors in the first predetermined time period, the power state of the image forming apparatus to a second OFF state which is a shutdown state,
wherein, in a case where a second predetermined time period which is longer than the first predetermined time period passes, a system reset process is performed to forcibly turn off the image forming apparatus.

2. The image forming apparatus according to claim 1, wherein the one or more processors performs shutdown processing if the one or more jobs have not been cancelled by the one or more processors in the first predetermined time period, and wherein the power state of the image forming apparatus is shifted to the second OFF state after the shutdown processing is performed.

3. The image forming apparatus according to claim 1, wherein the one or more processors performs control to store, in the storage, status information of the one or more processors which exists before the power state of the image forming apparatus is shifted to the first OFF state.

4. The image forming apparatus according to claim 1, wherein the storage is a volatile memory, and the first OFF state is a suspend state in which power is supplied to the volatile memory and is not supplied to the one or more processors.

5. The image forming apparatus according to claim 1, wherein the storage is a non-volatile memory and the first OFF state is a hibernation state in which power is not supplied to the non-volatile memory and is not supplied to the one or more processors.

6. The image forming apparatus according to claim 1, wherein the second OFF state is an OFF state in which power is not supplied to the image forming apparatus.

7. The image forming apparatus according to claim 1, wherein the one or more processors performs a resume operation using status information of the image forming apparatus stored in the storage during the first OFF state in a case where an operation to shift the image forming apparatus to the ON state is received by the interface after the image forming apparatus is in the first OFF state.

8. The image forming apparatus according to claim 1, wherein the one or more processors performs a cold-boot process in a case where an operation to shift the image forming apparatus to the ON state is received by the interface after the image forming apparatus is in the second OFF state.

9. The image forming apparatus according to claim 1, wherein the one or more processors stops receiving a job in a case where the operation to shift the image forming apparatus to the OFF state is received by the interface.

10. The image forming apparatus according to claim 1, wherein the first predetermined time period corresponds to a time period from a first time when the operation to switch the power state of the image forming apparatus to the OFF state is received to a second time when a predetermined time has elapsed from the first time.

11. The image forming apparatus according to claim 1, wherein a time length for shifting the image forming apparatus from the first OFF state to the ON state is shorter than a time length for shifting the image forming apparatus from the second OFF state to the ON state.

12. A method of controlling an image forming apparatus, the method comprising:
receiving an operation to switch a power state of the image forming apparatus from an ON state to an OFF state;
measuring a time in accordance with the reception of the operation to switch the power state of the image processing apparatus from the ON state to the OFF state;
cancelling one or more jobs which are stored in the image forming apparatus in accordance with the reception of the operation to switch the power state of the image forming apparatus to the OFF state; and
shifting, after the cancellation of the one or more jobs is completed, the power state of the image forming apparatus to a first OFF state which is different from a shutdown state, under at least a condition that the one or more jobs have been cancelled in a first predetermined time period, wherein in the first OFF state, a storage unit stores status information that is stored in the image forming apparatus before the image forming apparatus shifts to the first OFF state, and
shifting, under at least a condition that a cancellation of the one or more jobs has been started to shift to the first OFF state but the one or more jobs have not been cancelled in the first predetermined time period, the power state of the image forming apparatus to a second OFF state which is a shutdown state,
wherein, in a case where a second predetermined time period which is longer than the first predetermined time period passes, a system reset process is performed to forcibly turn off the image forming apparatus.

13. The method according to claim 12, wherein the second OFF state is an OFF state in which power is not supplied to the image forming apparatus.

14. A non-transitory storage medium storing a program for causing a computer of an image forming apparatus, to execute a method comprising:
receiving an operation to switch a power state of the image forming apparatus from an ON state to an OFF state;
measuring a time in accordance with the reception of the operation to switch the power state of the image processing apparatus from the ON state to the OFF state;
cancelling one or more jobs which are stored in the image forming apparatus, in accordance with the reception of the operation to switch the power state of the image forming apparatus to the OFF state; and
shifting, after the cancellation of the one or more jobs is completed, the power state of the image forming apparatus to a first OFF state which is different from a shutdown state, under at least a condition that the one or more jobs have been cancelled in a first predetermined time period, wherein, in the first OFF state, a storage stores information that is stored in the image forming apparatus before the image forming apparatus shifts to the first OFF state, and
shifting, under at least a condition that a cancellation of the one or more jobs has been started to shift to the first OFF state but the one or more jobs have not been cancelled by the control unit in the first predetermined time period, the power state of the image forming apparatus to a second OFF state which is a shutdown state,
wherein, in a case where a second predetermined time period which is longer than the first predetermined time period passes, a system reset process is performed to forcibly turn off the image forming apparatus.

15. An image forming apparatus comprising:
a power switch that receives an operation to turn off the image forming apparatus;
a timer that measures a time in accordance with a reception of the operation to turn off the image forming apparatus;
a central processing unit (CPU) that starts, under at least a condition that the power switch receives the operation to turn off the image forming apparatus, a first process to shift the image forming apparatus to a first off state which is not a shutdown state, wherein, in the first off state, status information of the image forming apparatus is stored in a storage;
a power supply control unit that starts a second process to shift, under at least a condition that the process to shift the image forming apparatus to the first off state is started but is not completed in a first predetermined time period after the operation is received, to a second off state which is a shutdown state, and
a reset unit performs a system reset to stop power supply to the image forming apparatus and to forcibly turn off the image forming apparatus in a case where a second predetermined time period which is longer than the first predetermined time period passes.

16. The image forming apparatus according to claim 15, wherein
the one or more processors cancels, in a case where the operation to turn off the image forming apparatus is received, one or more jobs which are stored in the image forming apparatus, and
the power supply control unit shifts the image forming apparatus to the first off state after cancellation of the one or more jobs is completed, and the power supply control unit shifts, if the cancellation of the one or more jobs is not completed in the first predetermined time period after the operation is received, the image forming apparatus to the second off state, wherein once the cancellation of the one or more jobs is completed, the cancelled one or more jobs are not resumed.

17. The image forming apparatus according to claim 15, wherein the storage is a volatile memory, and wherein power is supplied to the volatile memory in the first off state and power is not supplied to the volatile memory in the second off state.

18. The image forming apparatus according to claim 15, wherein the first off state is a suspend state.

19. The image forming apparatus according to claim 15, wherein the first off state is a hibernation state.

20. The image forming apparatus according to claim 15, wherein the one or more processors further perform a resume operation using the status information of the image forming apparatus stored in the storage in a case where the power switch receives an operation to shift the image forming apparatus to the ON state when the image forming apparatus is in the first off state.

21. The image forming apparatus according to claim 15, wherein the first predetermined time period corresponds to a time period from a first time when the operation to turn off the image forming apparatus is received to a second time when a predetermined time has elapsed from the first time.

* * * * *